July 20, 1943.  R. W. LYTLE  2,324,589
ELECTROCONDUCTIVE WHEEL
Filed July 10, 1942

Inventor:
Robert W. Lytle.
By Chritton, Wiles, Davies & Hirschl.
Attys.

Patented July 20, 1943

2,324,589

UNITED STATES PATENT OFFICE 2,324,589

ELECTROCONDUCTIVE WHEEL

Robert W. Lytle, Cincinnati, Ohio, assignor to The Formica Insulation Company, a corporation of Ohio Application July 10, 1942, Serial No. 450,385

2 Claims. (Cl. 301—63)

This invention relates to wheels, and more particularly to wheels made from resinous insulating material and provided with means for conducting static electricity from the axle of a vehicle to the ground.

The primary object of the invention is to provide an improved wheel for small trucks which may be used in powder factories, powder loading plants, or anywhere in the vicinity of explosive material which might be set off by a spark.

It is well known that wheels made of hard metals, such as iron or steel, will spark when they hit an abrasive of the type frequently encountered on factory floors. Such sparking through impact can be avoided through use of tires of insulating material, such as rubber, but a rubber tire provides no means for discharging static electricity that may accumulate on the truck.

In my Patent No. 2,267,503, issued December 23, 1941, several forms of electroconductive wheels were disclosed. The present invention is an improvement over the wheel and method described in the patent and produces a wheel which is easier to manufacture and is more safe because of its improved construction.

In manufacturing a wheel in accordance with the present invention, the rim portion and hub portions are formed of convolutions of a fabric coated with a powdered electrical conducting material, such as graphite, and impregnated with a thermosetting binder, such as phenol formaldehyde resin. The rim portion and hub portion are connected by a spiral strip which preferably is continuous with the rim and hub portions. The web portion may be formed of molding powder or macerated fabric impregnated with the same resin. After the assembly has been impressed in a mold, it is consolidated under heat and pressure to render the resin infusible and substantially insoluble.

The invention is illustrated in the preferred embodiment in the accompanying drawing, in which—

Figure 1:
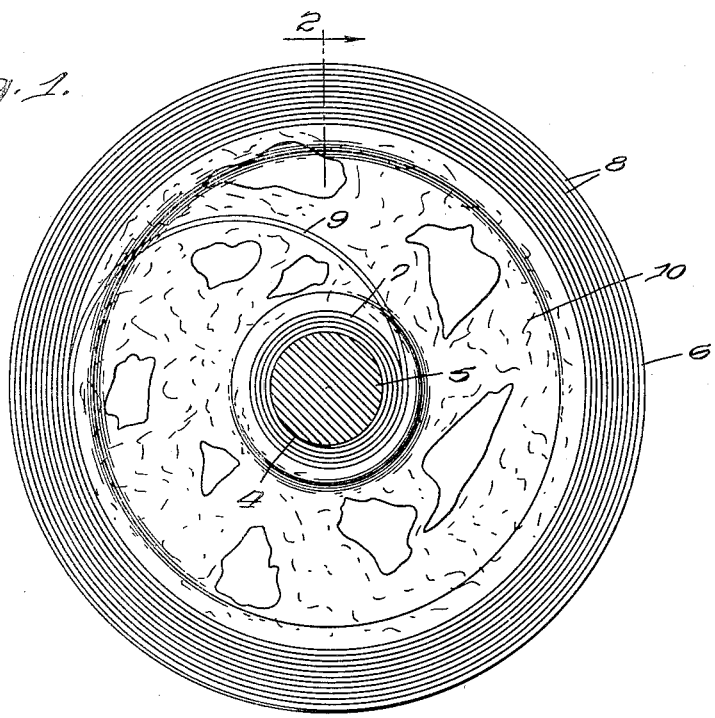
Figure 2:
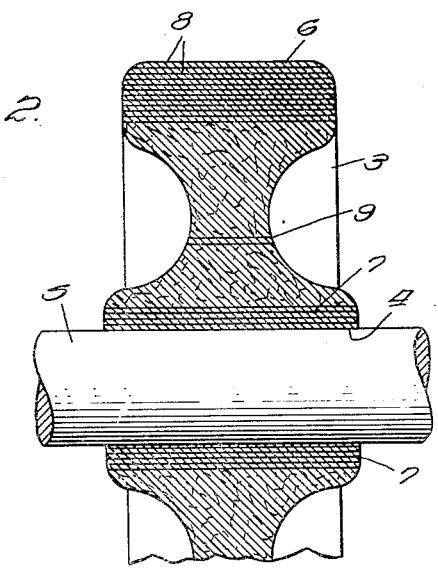

Figure 1 is a side elevational view of an improved wheel; and Figure 2, a fragmentary sectional view, taken as indicated at line 2 of Figure 1.

In the embodiment illustrated, a wheel 3 having a bore 4 may be journalled on a metal shaft 5. A long continuous strip of woven fabric 6, or several strips connected together, are coated with a finely divided conducting material such as colloidal graphite. Where graphite is used, it is found that where the graphite comprises about 7% of the weight of the fabric, satisfactory results are obtained. The fabric is then impregnated with a heat-hardenable binder, such as a phenol formaldehyde type of resin, and the strip is wound so that its inner convolutions form laminations 7 which are connected to the rim laminations 8 by an integral spiral connection 9.

The coils are then placed in a mold and the web portion 10 is packed with macerated fabric impregnated with a similar resin. The mold is then closed up and considerable pressure is applied. This crushes down the laminations and by the application of heat, the resin is transformed into its final infusible and substantially insoluble condition.

In the methods heretofore used, where a wire was relied upon to conduct electricity from the rim portion to the hub portion, it was found that the application of pressure to the mold frequently caused the wire to break and the wheel was not electroconductive. Other forms having a series of disks coated with conducting material and which extended from the hub to the rim usually produced a satisfactory product but were difficult and expensive to assemble in the mold. The present method is easy to perform and a very satisfactory product is obtained. Each of the wheels is carefully tested after the molding operation and the losses, due to a poor electrical connection, are practically negligible.

It will be understood that the drawings, for clearness, are somewhat diagrammatic and that in the final product it is difficult to observe the laminations and connecting spiral 9. Also, in the sectional view the laminations are not as straight and regular as indicated in the drawing.

The foregoing detailed description has been given for clearness of understanding only, and no unnecessary limitations should be understood therefrom for some modifications will be obvious to those skilled in the art.

I claim:

1. A molded electroconductive wheel comprising: rim portion and hub portion closely wound laminations of fabric coated with a powdered electrical conducting material and impregnated with a thermosetting binder; a fabric strip similarly treated and extending spirally from the hub laminations to the rim laminations; and a web portion of macerated fabric impregnated with said thermosetting binder and packed about said spiral strip, the assembly having been consolidated under heat and pressure and the binder transformed into a hard infusible and substantially insoluble condition.

2. A molded electroconductive wheel comprising: a laminated rim portion and spaced hub portion each formed of a plurality of closely wound convolutions of a single continuous strip of fabric coated with a powdered electrical conducting material and impregnated with a thermosetting resin; and an intermediate web portion of fibrous material packed around the connecting strip and impregnated with said thermosetting resin, said resin having been rendered infusible and substantially insoluble through the application of heat and pressure.

ROBERT W. LYTLE.